(12) United States Patent
Nale et al.

(10) Patent No.: US 12,443,367 B2
(45) Date of Patent: Oct. 14, 2025

(54) PERFECT ROW HAMMER TRACKING WITH MULTIPLE COUNT INCREMENTS

(71) Applicant: Intel Corporation, Santa Clara, CA (US)

(72) Inventors: Bill Nale, Livermore, CA (US); Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 17/561,598

(22) Filed: Dec. 23, 2021

(65) Prior Publication Data

US 2022/0121398 A1 Apr. 21, 2022

(51) Int. Cl.
*G06F 3/00* (2006.01)
*G06F 3/06* (2006.01)
*G11C 11/406* (2006.01)
*G11C 11/4091* (2006.01)
*G11C 11/4096* (2006.01)

(52) U.S. Cl.
CPC .......... *G06F 3/0659* (2013.01); *G06F 3/0604* (2013.01); *G06F 3/0679* (2013.01); *G11C 11/406* (2013.01); *G11C 11/4091* (2013.01); *G11C 11/4096* (2013.01)

(58) Field of Classification Search
CPC .... G06F 3/0659; G06F 3/0604; G06F 3/0679; G11C 11/406; G11C 11/4091; G11C 11/4096
See application file for complete search history.

(56) References Cited

U.S. PATENT DOCUMENTS

| | | | |
|---|---|---|---|
| 11,403,010 | B2 | 8/2022 | Huang |
| 11,429,469 | B2 | 8/2022 | Khakifirooz et al. |
| 2015/0262652 | A1* | 9/2015 | Igarashi ............ G11C 11/40622 711/106 |
| 2019/0228813 | A1* | 7/2019 | Nale ..................... G06F 3/0659 |
| 2021/0264999 | A1 | 8/2021 | Bains et al. |
| 2021/0365316 | A1 | 11/2021 | Nale et al. |
| 2022/0350500 | A1 | 11/2022 | Chen et al. |

* cited by examiner

*Primary Examiner* — Craig S Goldschmidt
(74) *Attorney, Agent, or Firm* — Compass IP Law PC

(57) ABSTRACT

A memory device can internally track row address activates for perfect row hammer tracking, incrementing an activate count for each row when an access command is received for a row. Instead of incrementing the count for each activate, the memory controller can indicate a number greater than one for the memory device to increment the count, and then indicate not to increment the count for subsequent accesses up to the number indicated. The memory controller can determine whether the row address of an activate command is one of N recent row addresses that received the access command. The memory controller can indicate an increment of zero if the row address is one of the N recent addresses, and indicate an increment of a number higher than one if the row address is not one of the N recent addresses.

20 Claims, 9 Drawing Sheets

PERFECT ROW HAMMER TRACKING WITH MULTIPLE COUNT INCREMENTS

FIELD

Descriptions are generally related to memory systems, and more particular descriptions are related to row hammer conditions.

BACKGROUND

Volatile memory devices, such as DRAM (dynamic random access memory) devices, have a known attack vector referred to as row hammer or row disturb. A row hammer condition refers to the flipping of a bit of an adjacent row (the victim row) by repeated access to a target row (aggressor row) within a time period. The repeated access to the target row causes a change in a value of a victim row that is adjacent or proximate to the target/aggressor row. Repeated activation of the target row causes migration of charge across the passgate of the victim row. With repeated manipulation of a target row with a known pattern, an attacker can intentionally flip bits of victim rows.

Perfect row hammer tracking (PRHT) requires the DRAM to increment an internal counter whose bits are stored in the DRAM row. The storing of the internal activate count ensures that the DRAM knows how many times each row has been activated. Thus, the DRAM can internally monitor for a row hammer condition and perform corrective action prior to a row reaching a threshold number of activates.

PRHT reduces the performance of DRAM access by increasing the row cycle time. The row cycle time needs to increase to accommodate the read-modify-write of each activated row of a DRAM access. Increasing the number of banks to allow more parallel access to the DRAM memory resources can partially offset the performance impact. However, increasing the banks adds cost to the DRAM and increases complexity to the controller scheduling, and may not be completely effective at offsetting the performance impact.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

As described herein, a memory device can internally track row address activates for perfect row hammer tracking, incrementing an activate count for each row when an access command is received for a row. Instead of incrementing the count for each access, the memory controller can indicate a number greater than one for the memory device to increment the count, and then indicate not to increment the count for subsequent access up to the number indicated. Thus, the read-modify-write to update the count can be avoided for accesses where the memory controller indicates no increment of the memory-side row activate count.

The memory controller can determine whether the row address of an access command is one of N recent row addresses that received the access command or is a row address of one of the most recent access commands send to the memory. The memory controller can indicate an increment of zero if the row address is one of the N recent addresses, and indicate an increment of a number higher than one if the row address is not one of the N recent addresses. Thus, the memory system can implement a modified perfect row hammer tracking (PRHT) where the memory device does not increment the count on every access, but will overall still track all activates.

The host controller or memory controller can specify to the memory device (e.g., a dynamic random access memory (DRAM) device) the amount that the row activation count should be incremented by. Incrementing by an amount other than zero will cause the row cycle time to be increased. Incrementing the count by zero causes no row cycle time increase, reducing the performance impact of management of the count for PRHT.

Figure 1:
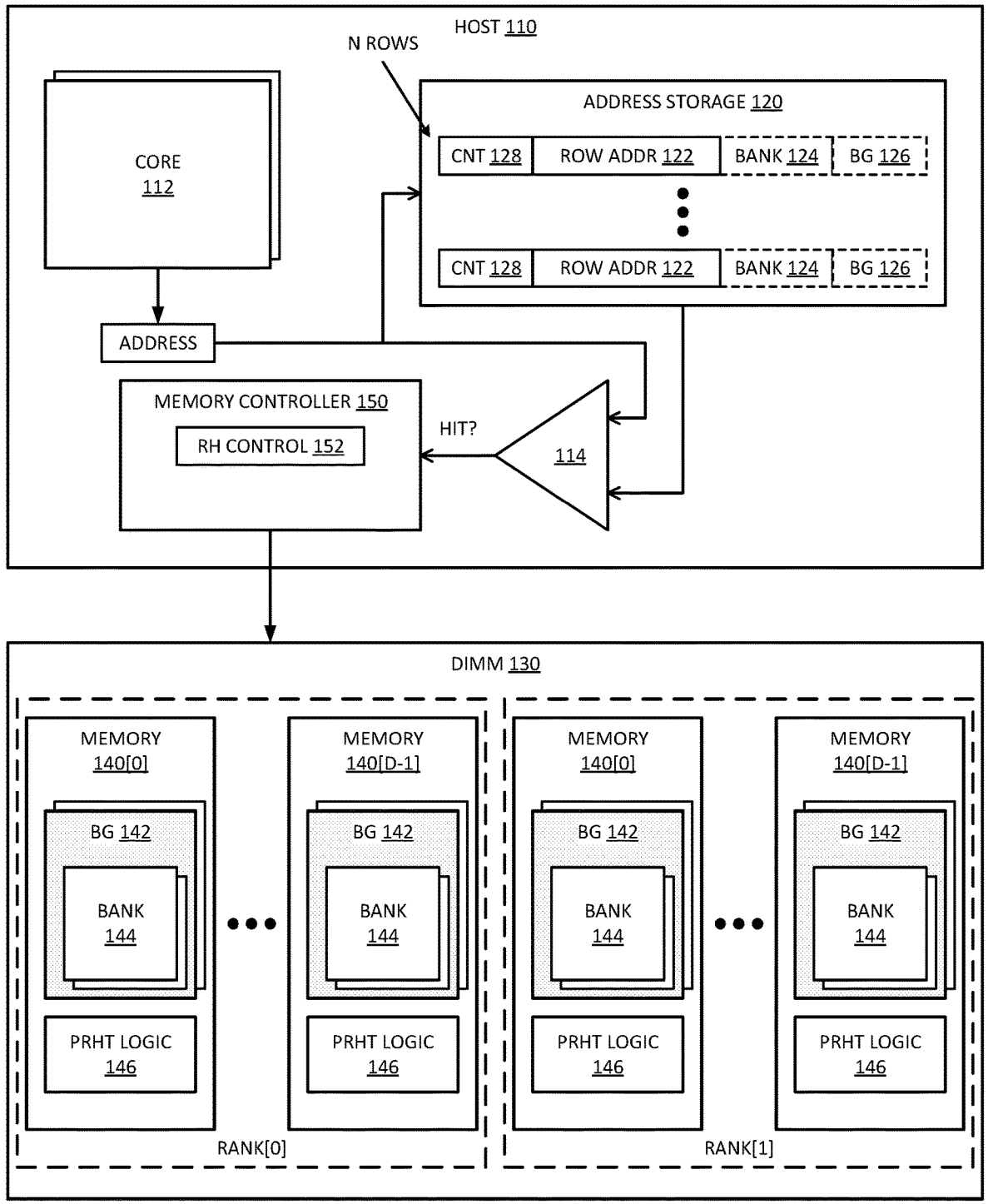
FIG. 1 is a block diagram of an example of a system with selective perfect row hammer count increase with a host-side address storage.

FIG. 1 is a block diagram of an example of a system with selective perfect row hammer count increase with a host-side address storage. System 100 illustrates components associated with a memory subsystem. Host 110 represents a host hardware platform to which DIMM (dual inline memory module) 130 is connected. Host 110 provides a hardware platform to which peripheral components and devices can be connected.

Host 110 can represent a host processor, such as a CPU (central processing unit) or GPU (graphics processing unit) SOC (system on a chip). Host 110 can include multiple processor cores, represented by core 112. During execution of operations, core 112 generates an address of a row of memory for access. The access can be a read operation, a write operation, a precharge, an activation, or other access that involves charging the row. Host 110 includes memory controller 150, which represents a host controller that manages access to the memory resources of DIMM 130.

DIMM 130 includes multiple memory devices, which can be organized in channels and ranks. In one example, the memory devices of DIMM 130 are organized as ranks, with Rank[0] and Rank[1] illustrated in system 100. A rank refers to memory devices that will execute a command in parallel, being triggered by the same chip select (CS). As illustrated, each rank includes D memory devices, represented as memory 140[0:(D−1)], collectively, memory 140.

In one example, each memory 140 includes a memory array organized as multiple banks 144. The banks can be grouped in bank groups (BG) 142. The memory array can be accessed by row address, bank address, and bank group address, with different combinations of addresses selecting different groups of bits for access.

In one example, memory 140 includes PRHT (perfect row hammer tracking) logic 146, which represents circuitry in memory to monitor or track row hammer information per row. PRHT logic 146 includes a count stored with each row, as well as comparison circuitry that allows the memory device to determine when a row should have an extra refresh to mitigate a row hammer condition. Traditionally, PRHT logic 146 would increment by one for each row access. In system 100, memory controller 150 can indicate to PRHT logic 146 whether to increment for a specific access or whether to forego incrementing for a specific access.

In one example, memory controller 150 includes row hammer (RH) control 152. Row hammer control 152 enables memory controller 150 to monitor and respond to row hammer conditions. In one example, row hammer control 152 enables memory controller 150 to generate an indication to memory 140 whether it should increment a memory-side activation count and how much to increment the count.

In one example, host 110 includes address storage 120 to store the most recent row addresses that have been activated due to an access command or access request. In one example, address storage 120 stores the most recent row address that have been accessed for each bank. Row address (ADDR) 122 represents row addresses in address storage 120 or row address storage. In one example, address storage 120 represents a storage in host 110 separate from memory controller 150, and accessible to memory controller 150. In one example, address storage 120 includes address count (CNT) 128 for each row address 122. Count 128 can indicate how many times an access command has been sent to the row address without incrementing the activate count in memory 140.

In one example, when core 112 generates the address of the row to access, address storage 120 can perform a lookup of the row address, and comparator 114 determines whether there is an address hit. If there is an address hit, in one example, count 128 can be incremented for the address. In one example, rather than store the count of how many times the row address has been accessed in memory controller 150, address storage 120 includes a field with each row address to store the count. Thus, a lookup on address storage 120 can also access the activation count for memory controller 150.

Consider an example where memory controller 150 indicates to memory 140 to increment a row activation count (within PRHT logic 146) by M=2. In such a scenario, when a row address is opened which has not been opened recently (i.e., the address is not in address storage 120), memory controller 150 can determine there is not a hit on address storage 120. System 100 row hammer control 152 indicates for memory 140 to increment its activation count by 2. Address storage 120 can then store the address as one of row address 122. If the row is activated again while the address is in address storage 120, memory controller 150 can indicate to memory 140 to not increment the activation count at all, thus reducing the row cycle time. Memory controller 150 can increment address count 128 for the specific row address 122, determine that the address count is (M=2)−1=1, thus, the address count equals (M−1). Memory controller 150 can remove the row address from address storage 120.

In the example where M=2, memory controller 150 can indicate the memory 140 to internally increment its activation count by two, but only every other access, where for the intervening access(es), memory controller 150 indicates the memory to not increment the activation count or to increment by zero. In other implementations, M=3 or M=4 or some other number. Thus, memory controller 150 can initially indicate incrementing by M (e.g., 3 or 4), and then leaving the row address in address storage 120 until the number of accesses reaches M−1. Alternatively, address storage 120 evicts addresses based on a least recently used (LRU) implementation, which could evict a row address before it reaches M−1. As such, there is a possibility that PRHT 146 will not accurately reflect the activation count for one or more rows. However, the inaccuracy should tend to more refreshes, which would mitigate the row hammer conditions.

It will be understood that in the case where M=2, count 128 is not necessary, as memory controller 150 can simply trigger memory 140 to increment the memory-side count by 2 when the address is not found in address storage 120, and then indicate not to increment and remove the address when the address is found in address storage 120. For cases where M is greater than 2, count 128 can indicate how long to keep row address 122 in address storage 120 before removing it.

As an example, if the activate count is incremented by M=4, count can be a two bit field to store the count row address 122, staring as '00'. If another access or activate is sent to that row without incrementing the activation count, memory controller 150 can increment the field to '01', and so forth. If count 128 is '11' when an activate is sent (with no increment of the activation count), memory controller 150 can remove the specific row address 122 from the stored list, as a total of 4 activates have now been sent, the first incrementing the activation count by 4, and the next three not incrementing it at all.

In one example, address storage 120 stores N row addresses per bank. In one example, instead of storing N row addresses for a single bank, address storage 120 can store X addresses for an entire rank or channel with multiple banks, where X is a number different than N. X would typically be larger than N, but not as large as N*(#of banks). In such an implementation, address storage 120 can store bank address and bank group address, represented, respectively, as bank 124 and BG 126. In one example, address storage 120 would also store the rank number if the number of addresses applied to a channel.

It will be understood that storing X addresses instead of N addresses would require fewer total addresses to be stored, but more address information would be needed, and more storage locations would need to be checked on each memory access. In one example, address storage 120 is or includes a content addressable memory (CAM) to improve the address search performance. Such an implementation could result in less total logic in host 110, with an increase in complexity to perform the address monitoring.

Figure 2:
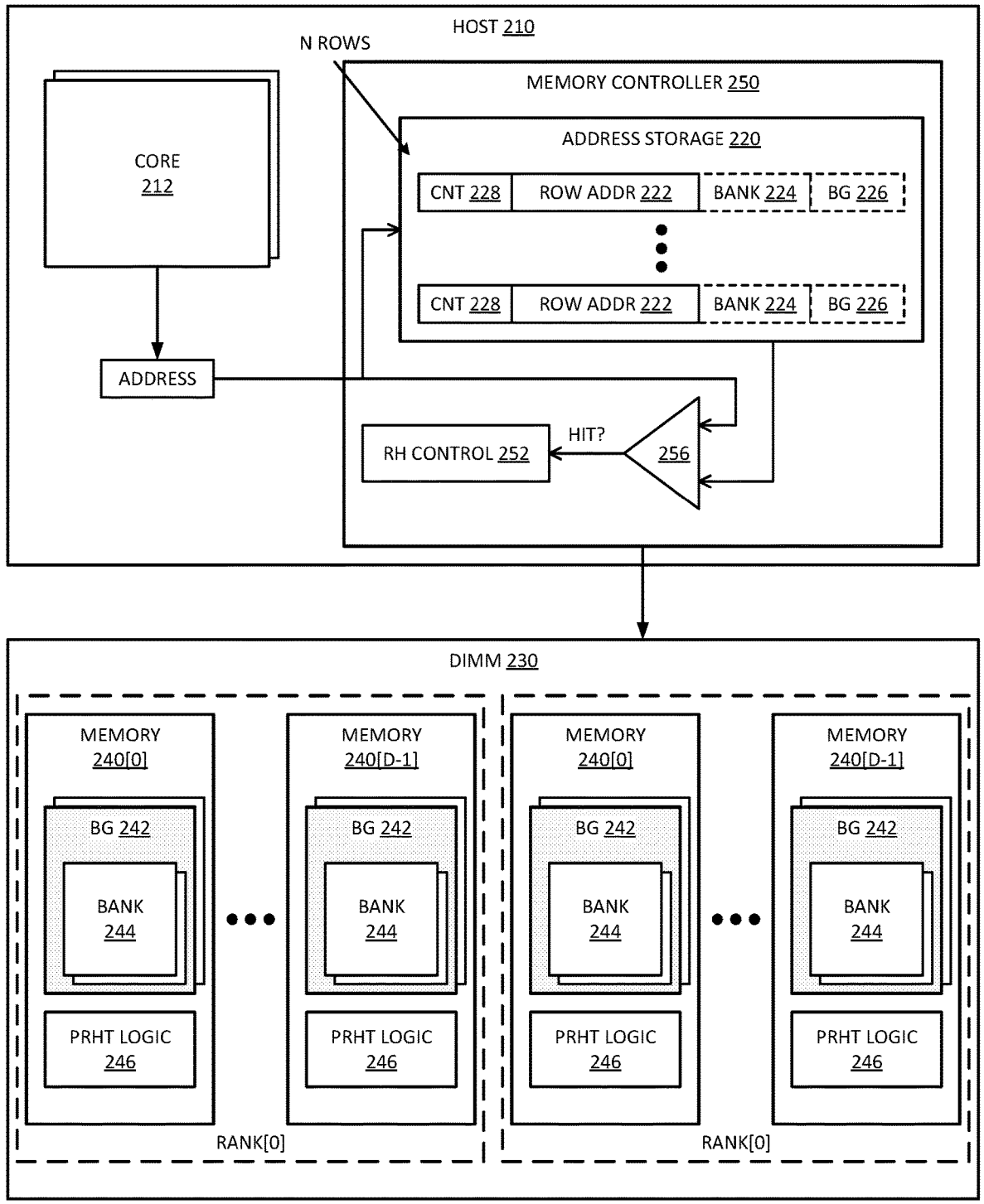
FIG. 2 is a block diagram of an example of a system with selective perfect row hammer count increase with an address storage in the memory controller.

FIG. 2 is a block diagram of an example of a system with selective perfect row hammer count increase with an address storage in the memory controller. System 200 illustrates components associated with a memory subsystem. Host 210 represents a host hardware platform to which DIMM (dual inline memory module) 230 is connected. Host 210 provides a hardware platform to which peripheral components and devices can be connected.

Host 210 can represent a host processor, such as a CPU (central processing unit) or GPU (graphics processing unit) SOC (system on a chip). Host 210 can include multiple processor cores, represented by core 212. During execution of operations, core 212 generates an address of a row of memory for access. The access can be a read operation, a write operation, a precharge, an activation, or other access that involves charging the row. Host 210 includes memory controller 250, which represents a host controller that manages access to the memory resources of DIMM 230.

DIMM 230 includes multiple memory devices, which can be organized in channels and ranks. In one example, the memory devices of DIMM 230 are organized as ranks, with Rank[0] and Rank[1] illustrated in system 200. A rank refers to memory devices that will execute a command in parallel, being triggered by the same chip select (CS). As illustrated, each rank includes D memory devices, represented as memory 240[0:(D−1)], collectively, memory 240.

In one example, each memory 240 includes a memory array organized as multiple banks 244. The banks can be grouped in bank groups (BG) 242. The memory array can be accessed by row address, bank address, and bank group address, with different combinations of addresses selecting different groups of bits for access.

In one example, memory 240 includes PRHT (perfect row hammer tracking) logic 246, which represents circuitry in memory to monitor or track row hammer information per row. PRHT logic 246 includes a count stored with each row, as well as comparison circuitry that allows the memory device to determine when a row should have an extra refresh to mitigate a row hammer condition. Traditionally, PRHT logic 246 would increment by one for each row access. In system 200, memory controller 250 can indicate to PRHT logic 246 whether to increment for a specific access or whether to forego incrementing for a specific access.

In one example, memory controller 250 includes row hammer (RH) control 252. Row hammer control 252 enables memory controller 250 to monitor and respond to row hammer conditions. In one example, row hammer control 252 enables memory controller 250 to generate an indication to memory 240 whether it should increment a memory-side activation count and how much to increment the count.

In one example, host 210 includes address storage 220 to store the most recent row addresses that have been activated due to an access command or access request. In one example, address storage 220 is within memory controller 250. Thus, the storage of address storage 220 can be considered part of memory controller 250 or is exclusive for use by memory controller 250. In an alternate example, address storage 220 could be within host 210, external to memory controller 250, such as in system 100.

In one example, address storage 220 stores the most recent row address that have been accessed for each bank. Row address (ADDR) 222 represents row addresses in address storage 220. In one example, address storage 220 represents a storage in host 210 separate from memory controller 250, and accessible to memory controller 250. In one example, address storage 220 includes address count (CNT) 228 for each row address 222. Count 228 can indicate how many times an access command has been sent to the row address without incrementing the activate count in memory 240.

In one example, when core 212 generates the address of the row to access, address storage 220 can perform a lookup of the row address, and comparator 256 determines whether there is an address hit. If there is an address hit, in one example, count 228 can be incremented for the address. In one example, rather than store the count of how many times the row address has been accessed in memory controller 250, address storage 220 includes a field with each row address to store the count. Thus, a lookup on address storage 220 can also access the activation count for memory controller 250.

Consider an example where memory controller 250 indicates to memory 240 to increment a row activation count (within PRHT logic 246) by M=2. In such a scenario, when a row address is opened which has not been opened recently (i.e., the address is not in address storage 220), memory controller 250 can determine there is not a hit on address storage 220. System 200 row hammer control 252 indicates for memory 240 to increment its activation count by 2. Address storage 220 can then store the address as one of row address 222. If the row is activated again while the address is in address storage 220, memory controller 250 can indicate to memory 240 to not increment the activation count at all, thus reducing the row cycle time. Memory controller 250 can increment address count 228 for the specific row address 222, determine that the address count is (M=2)−1=2, thus, the address count equals (M−1). Memory controller 250 can remove the row address from address storage 220.

In the example where M=2, memory controller 250 can indicate the memory 240 to increment its activation count by two, but only every other access, where for the intervening access(es), memory controller 250 indicates the memory to not increment the activation count or to increment by zero. In other implementations, M=3 or M=4 or some other number. Thus, memory controller 250 can initially indicate incrementing by M (e.g., 3 or 4), and then leaving the row address in address storage 220 until the number of accesses reaches M−1. Alternatively, address storage 220 evicts addresses based on a least recently used (LRU) implementation, which could evict a row address before it reaches M−1. As such, there is a possibility that PRHT 246 will not accurately reflect the activation count for one or more rows. However, the inaccuracy should tend to more refreshes, which would mitigate the row hammer conditions.

It will be understood that in the case where M=2, count 228 is not necessary, as memory controller 250 can simply trigger memory 240 to increment the memory-side count by 2 when the address is not found in address storage 220, and then indicate not to increment and remove the address when the address is found in address storage 220. For cases where M is greater than 2, count 228 can indicate how long to keep row address 222 in address storage 220 before removing it.

As an example, if the activate count is incremented by M=4, count can be a two bit field to store the count row address 222, staring as '00'. If another access or activate is sent to that row without incrementing the activation count, memory controller 250 can increment the field to '01', and so forth. If count 228 is '11' when an activate is sent (with no increment of the activation count), memory controller 250 can remove the specific row address 222 from the stored list, as a total of 4 activates have now been sent, the first incrementing the activation count by 4, and the next three not incrementing it at all.

In one example, address storage 220 stores N row addresses per bank. In one example, instead of storing N row addresses per bank, address storage 220 can store X addresses for an entire rank or channel, where X is a number different than N. X would typically be larger than N, but not as large as N*(#of banks). In such an implementation, address storage 220 can store bank address and bank group address, represented, respectively, as bank 224 and BG 226. In one example, address storage 220 would also store the rank number if the number of addresses applied to a channel.

It will be understood that storing X addresses instead of N addresses would require fewer total addresses to be stored, but more address information would be needed, and more storage locations would need to be checked on each memory access. In one example, address storage 220 is or includes a content addressable memory (CAM) to improve the address search performance. Such an implementation could result in less total logic in host 210, with an increase in complexity to perform the address monitoring.

Figure 3:
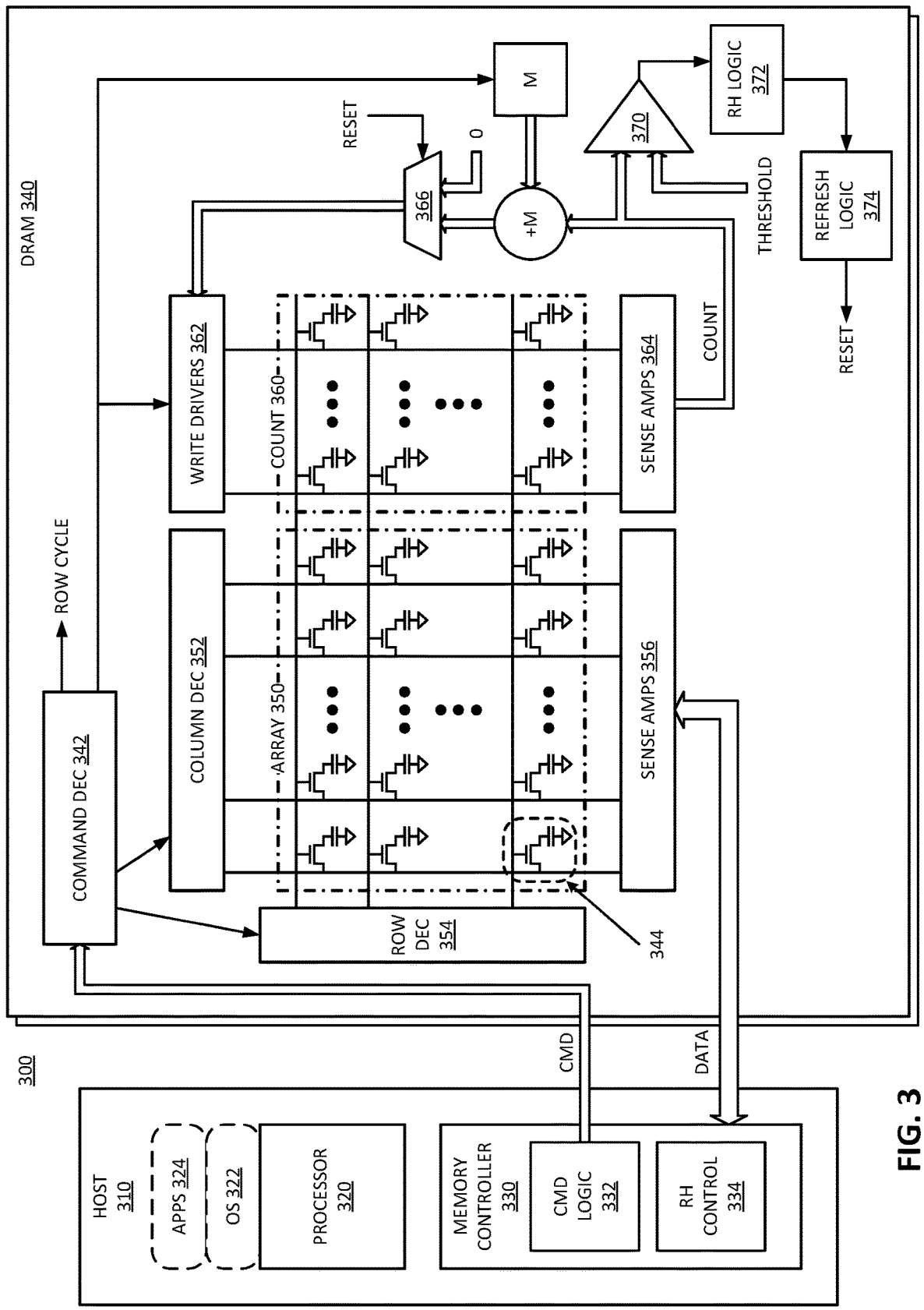
FIG. 3 is a block diagram of an example of a system with selective perfect row hammer count increase.

FIG. 3 is a block diagram of an example of a system with selective perfect row hammer count increase. System 300 provides an example of a DRAM chip in accordance with an example of system 100 or an example of system 200, where details of the DRAM are illustrated. In system 300, the memory is specifically illustrated as a DRAM (dynamic random access memory) device. DRAM 340 represents one of multiple DRAM devices that can be coupled to host 310.

Host 310 represents a hardware platform for system 300, with processor 320 and memory controller 330. Processor 320 can be referred to as a host processor. Processor 320 executes OS (operating system) 322, and OS 322 provides a software platform for system 300, on which other applications and processes will execute on the hardware platform of host 310. Applications (APPS) 324 represent other applications or services in system 300. The execution of OS 322 and applications 324 generate access requests for DRAM 340.

Memory controller 330 manages access to DRAM 340. In one example, memory controller 330 includes command (CMD) logic 332 to generate access commands to send to DRAM 340. The command is represented as CMD over a command bus to DRAM 340. The command can be any type of command that generates or is accompanied by an activate command. In one example, command logic 332 generates a command to indicate the count DRAM 340 should use to increment its internal activate count. The command can be an activate command, a precharge command, or another command with a field to indicate the value of M to increment the memory-side activate count.

In one example, memory controller 330 includes row hammer (RH) control 334, which represents circuitry or logic at memory controller 330 to determine when to send a command to indicate that DRAM 340 should increment its activate count by M, and when to send a command to indicate that DRAM 340 should not increment its activate count.

System 300 also illustrates a data bus, represented as DATA, coupling memory controller 330 to DRAM 340 to exchange data. The command bus is a unilateral bus and the data bus is a bidirectional bus.

DRAM 340 includes a memory array with multiple bitcells 344, which represents a memory cell or a storage location of the memory array. Bitcell 344 connects to a wordline (WL) and a bitline (BL), with the specific WL/BL location representing an address identifiable by a combination of row (WL) and column (BL) address, which may also require a bank and bank group address to specify a portion of the array to access.

Row decoder (DEC) 354 represents decoding hardware to select rows or wordlines for read, write, or other access. Column decoder (DEC) 352 represents decoding hardware to select columns or bitlines. Typically, selection includes charging a row and columns to access a group of bitcells. DRAM 340 does not specifically illustrate the banks, but it will be understood that the bitcell array can be organized as banks and bank groups. Sense amps (amplifiers) 356 represent sense amplifiers to stage data for access to array 350. For a write, write data is written into sense amps 356 and then into array 350. For a read, data is read from array 350 into sense amps 356, to return to memory controller 330 over the data bus.

DRAM 340 includes array 350, which represents a core memory cell array to store data. Count 360 represents memory cells to store an activation count or activate count for each row. In one example, count 360 represents bits at the end of each row of array 350 to provide storage for the count. Count 360 holds a value to indicate a number of activates since a last refresh of the row, and can be reset on refresh.

When memory controller 330 sends a memory access command to DRAM 340, command decoder (DEC) 342 identifies the command and controls appropriate column decoder circuitry and row decoder circuitry to select the specified address. In one example, each command that triggers an activation of a row of array 350 includes a field to indicate a value M (an integer) by which count 360 should be incremented.

Each time a command from memory controller 330 triggers a row activation, circuitry in DRAM 340 can read count 360 for the selected row into sense amps 364. The value is the count value, which can be compared with comparator 370 to a threshold value. If the row activation count for any particular row reaches the threshold, the memory chip recognizes the existence of a row hammer condition for the particular row.

In one example, when comparator 370 generates a row hammer condition indicator, row hammer (RH) logic 372 can identify the row hammer condition and trigger an operation by refresh logic 374. Refresh logic 374 can notify memory controller 330 of the condition specifically, or generally indicate a need for additional refresh cycles. Refresh logic 374 can execute a refresh of the row when memory controller 330 generates a refresh command with command logic 332. In one example, refresh logic 374 generates a reset signal that is described below.

Sense amps 364 can provide the activate count value (COUNT) to a summing or incrementing circuit to increment the count by M. In one example, a count increment field in a command received at command decoder 342 will act as an enable for write drivers 362 and for the summing circuit. When M is positive, indicating that the value should be incremented, the circuitry of DRAM 340 can increment the count by +M, and selector 366 will pass the incremented value to write drivers 362. Write drivers 362 can then write the incremented value to count 360.

In one example, when the value is zero, write drivers 362 can be disabled, and there will be no delay to write count 360. Command decoder 342 or other circuitry can indicate the timing difference between writing count 360 and not writing count 360, by generating the row cycle indicator (ROW CYCLE). It will be understood that when the increment field is zero, DRAM 340 can generate an indication, such as by command decoder 342, that the row cycle time is only what is needed to access array 350. When the field is not zero, DRAM 340 can generate an indication that the row cycle time is extended to include the read-modify-write (RMW) of count 360.

In one example, when refresh logic 374 detects that a refresh occurs, whether triggered by row hammer logic 372, or simply another refresh of a row, it can generate the RESET signal. At selector 366, the reset signal can cause the selector to select all zeros to provide to write drivers 362. Thus, write drivers 362 can zero out the activate count for a row after refresh of the row. When the row is incremented write drivers 362 will write the incremented value to count 360.

In one example, row hammer control 334 of memory controller 330 enables memory controller 330 to make a determination about when to increment the row activate count, and make a determination about how much to increment the row count. While the examples above provide simple examples of incrementing by a set number, in one example, the memory controller 330 implements more complex algorithmic determinations to change the activation count by a variable amount. Thus, memory controller 330 can indicate a value anywhere from 0 to M−1, and command decoder 342 can pass that value along to the +M circuitry. Thus, memory controller 330 can determine to increment the count by different amounts for different rows under different conditions.

In one example, command logic 332 generates a command with a field to indicate M. If DRAM 340 increments count 360 immediately upon an activate command, memory controller 330 can indicate the increment amount in the activate command itself. If DRAM 340 increments the count based on a special command or specialized command from memory controller 330, memory controller 330 generates and send that special command with the value M indicated. If DRAM 340 increments the count on a precharge command, memory controller 330 can include a field in the precharge command to indicate the increment value.

Figure 4:
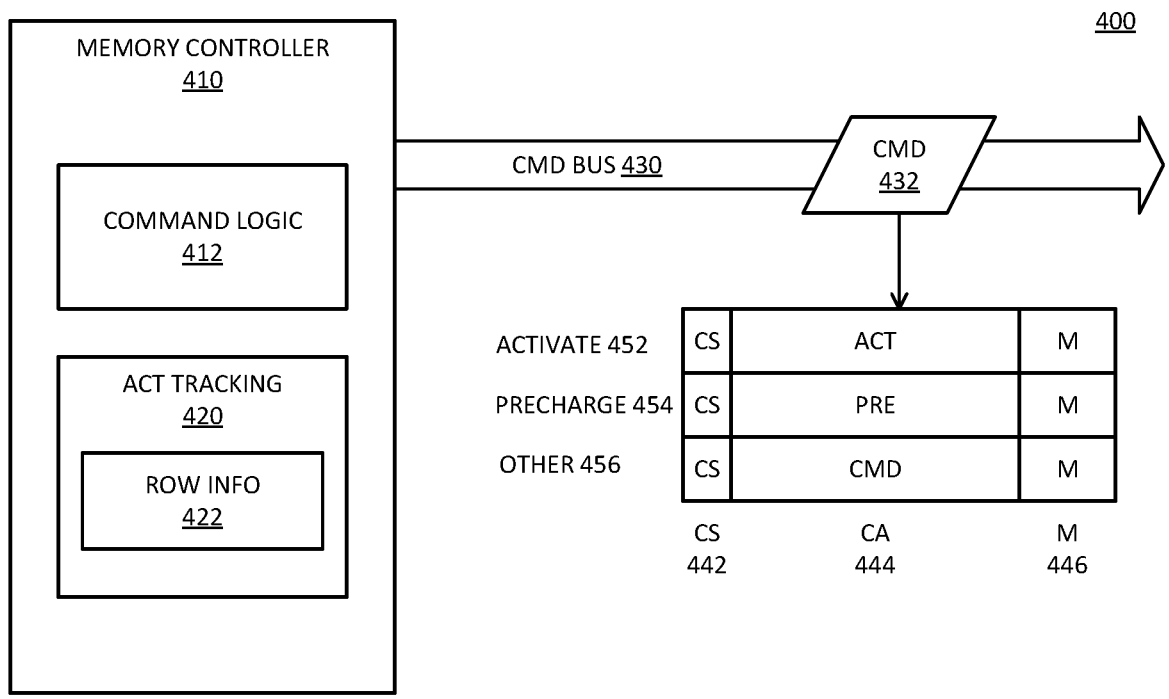
FIG. 4 is a block diagram of an example of a command to trigger perfect row hammer selective count increase.

FIG. 4 is a block diagram of an example of a command to trigger perfect row hammer selective count increase. System 400 represents a system in accordance with an example of system 100, an example of system 200, or an example of system 300.

Memory controller 410 interfaces with a memory device or DRAM device that keeps an internal row activation count. Memory controller 410 can determine how much to increment the row activation count and when to increment the row activation count. Memory controller 410 includes command logic 412 to generate commands to send to the memory device. Command (CMD) 432 represents a command sent by memory controller 410 over command (CMD) bus 430 to the memory device to indicate a row activation increment amount. Thus, command 432 can represent an indication command sent by memory controller 410 to the memory.

In one example, command 432 is an activate command, as represented by activate 452. Activate 452 can include CS field represented by CS 442, a command and address (CA) field for command encoding represented by CA 444, and a row activation count increment value represented by M 446. In one example, command 432 is a precharge command, as represented by precharge 454. Precharge 454 can include a value for CS 442, a command encoding for CA 444, and a row activation count increment value represented by M 446. In one example, command 432 is a special command or some other command to indicate the increment value, as represented by other 456. Other 456 can include a value for CS 442, a command encoding for CA 444, and a row activation count increment value represented by M 446.

Such commands can use bits in the command encoding that are not currently used by the respective commands. Thus, memory devices not enabled with PRHT can ignore the M value, and memory devices enabled with PRHT can read the M value to determine how much to increment the count.

Figure 5:
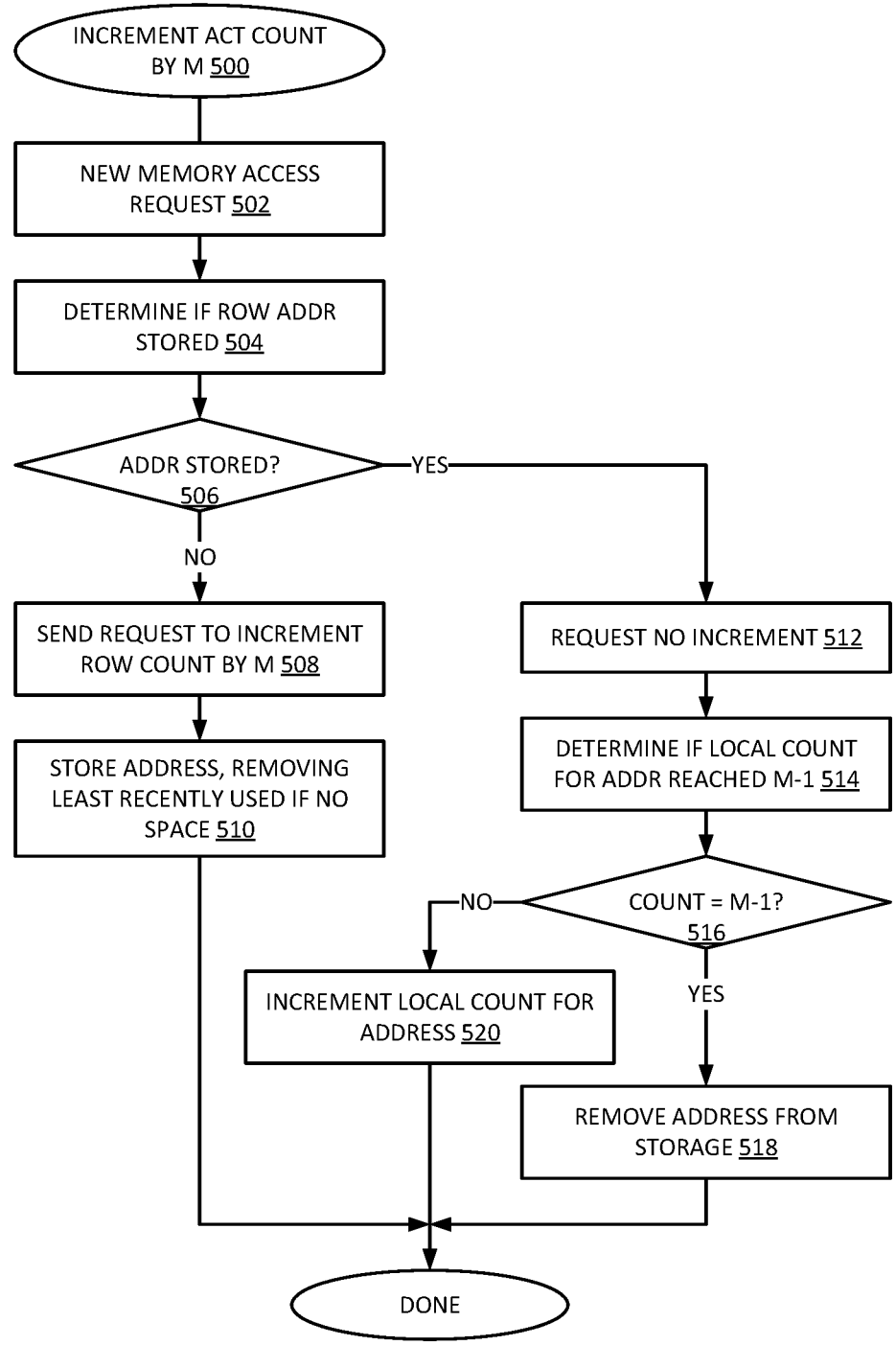
FIG. 5 is a flow diagram of an example of a process for selectively increasing a perfect row hammer count.

FIG. 5 is a flow diagram of an example of a process for selectively increasing a perfect row hammer count. Process 500 is an example of a process to increment an activation row count by a value M, where M is greater than 1.

The host generates a new memory access request, at 502. In one example, the memory controller determines if the row address (ADDR) associated with the memory access request is stored in a store of recently accessed row addresses, at 504. If the address is not stored, at 506 NO branch, in one example, the memory controller sends a request to the memory device to request the memory device to increment its internal row count by M, where M is an integer greater than 1, at 508. In one example, the memory controller stores the address, removing a least recently used address from the storage if there is no space in the storage, at 510. In one example, the storage is limited to N addresses. Thus, if there are N addresses already stored, the memory controller will remove one to store the address of the new memory access request.

If the address is stored, at 506 YES branch, in one example, the memory controller generates an indication that the memory device not increment its row count, at 512. The request to not increment the row count can be a field in a command, or it can be placing a zero value in the increment amount field.

In one example, the memory controller can determine if a local count within the host for the address has reached M−1, at 514. If the host-side count for the row has reached M−1, there have been M activates or accesses to the row without incrementing the memory-side count. If the count is equal to M−1, at 516 YES branch, in one example, the memory controller removes the address from storage, at 518. If the count is not equal to M−1, at 516 NO branch, in one example, the memory controller increments the local (host-side) count for the address, at 520. The process completes until the next new memory request.

Figure 6:
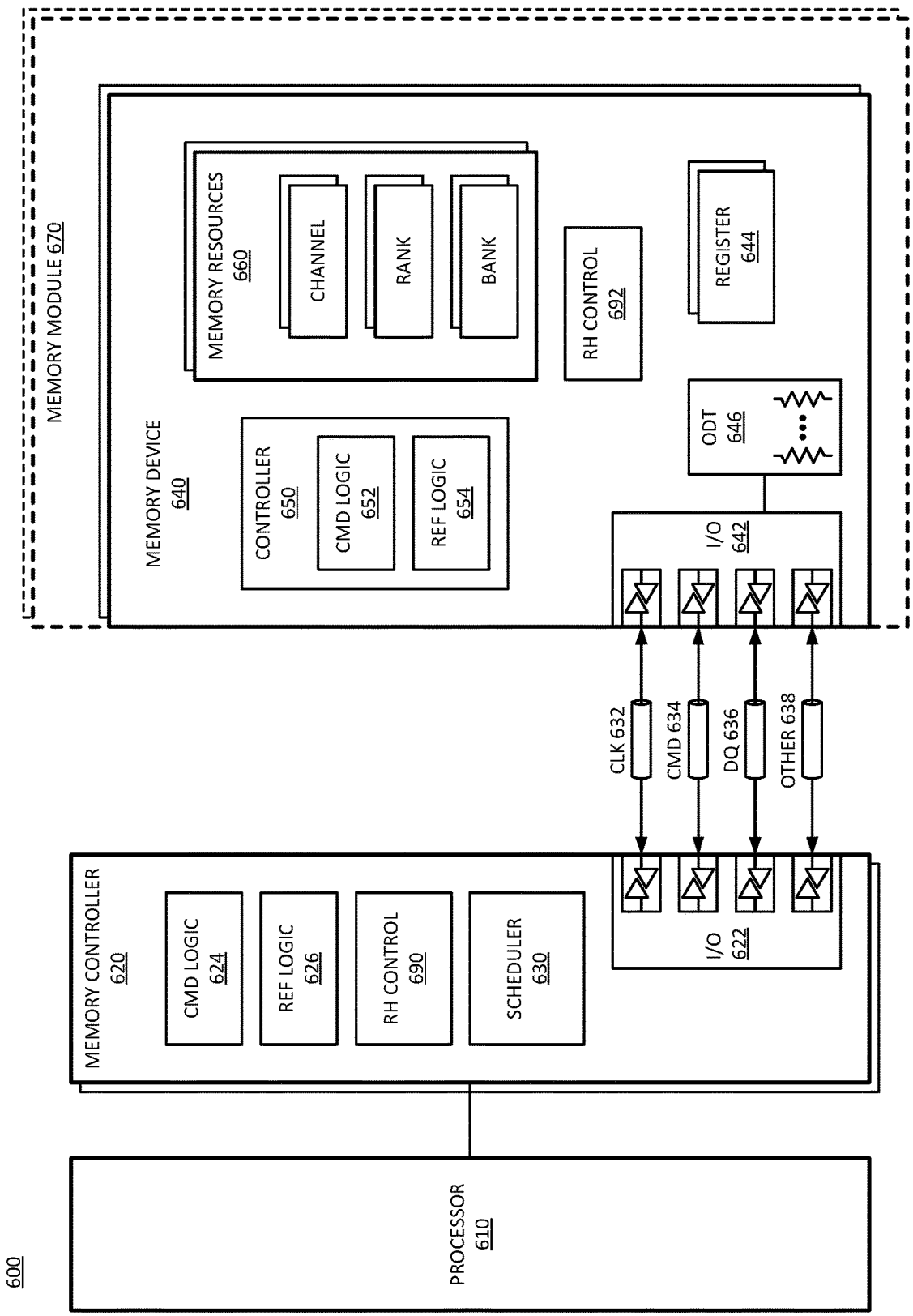
FIG. 6 is a block diagram of an example of a memory subsystem in which selectively increasing a perfect row hammer count can be implemented.

FIG. 6 is a block diagram of an example of a memory subsystem in which selectively increasing a perfect row hammer count can be implemented. System 600 includes a processor and elements of a memory subsystem in a computing device. System 600 represents a system in accordance with an example of system 100, an example of system 200, or an example of system 300.

In one example, memory device 640 includes row hammer (RH) control 692. Row hammer control 692 enables memory device 640 to implement PRHT by maintaining a count for each row to indicate a number of counts for the row since the last refresh of that row. In one example, memory controller 620 includes row hammer control 690. Row hammer control 690 enables memory controller 620 to maintain an address buffer to store most recently used row addresses for access to memory device 640. Based on the storage of most recently used row addresses and other determinations, memory controller 620 can generate an indication to memory device 640 to increment its row activation count by a value greater than 1 for selected accesses, and to increment by zero or bypass incrementing the count for other accesses. The indication and the bypassing of the incrementing the count can be in accordance with any example herein.

Processor 610 represents a processing unit of a computing platform that may execute an operating system (OS) and applications, which can collectively be referred to as the host or the user of the memory. The OS and applications execute operations that result in memory accesses. Processor 610 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 600 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 620 represents one or more memory controller circuits or devices for system 600. Memory controller 620 represents control logic that generates memory access commands in response to the execution of operations by processor 610. Memory controller 620 accesses one or more memory devices 640. Memory devices 640 can be DRAM devices in accordance with any referred to above. In one example, memory devices 640 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 620 manages a separate memory channel, although system 600 can be configured to have multiple channels managed by a single controller, or to have multiple controllers on a single channel. In one example, memory controller 620 is part of host processor 610, such as logic implemented on the same die or implemented in the same package space as the processor.

Memory controller 620 includes I/O interface logic 622 to couple to a memory bus, such as a memory channel as referred to above. I/O interface logic 622 (as well as I/O interface logic 642 of memory device 640) can include pins, pads, connectors, signal lines, traces, or wires, or other hardware to connect the devices, or a combination of these. I/O interface logic 622 can include a hardware interface. As illustrated, I/O interface logic 622 includes at least drivers/transceivers for signal lines. Commonly, wires within an integrated circuit interface couple with a pad, pin, or connector to interface signal lines or traces or other wires between devices. I/O interface logic 622 can include drivers, receivers, transceivers, or termination, or other circuitry or combinations of circuitry to exchange signals on the signal lines between the devices. The exchange of signals includes at least one of transmit or receive. While shown as coupling I/O 622 from memory controller 620 to I/O 642 of memory device 640, it will be understood that in an implementation of system 600 where groups of memory devices 640 are accessed in parallel, multiple memory devices can include I/O interfaces to the same interface of memory controller 620. In an implementation of system 600 including one or more memory modules 670, I/O 642 can include interface hardware of the memory module in addition to interface hardware on the memory device itself. Other memory controllers 620 will include separate interfaces to other memory devices 640.

The bus between memory controller 620 and memory devices 640 can be implemented as multiple signal lines coupling memory controller 620 to memory devices 640. The bus may typically include at least clock (CLK) 632, command/address (CMD) 634, and write data (DQ) and read data (DQ) 636, and zero or more other signal lines 638. In one example, a bus or connection between memory controller 620 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 600 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 620 and memory devices 640. An example of a serial bus technology is 8B10B encoding and transmission of high-speed data with embedded clock over a single differential pair of signals in each direction. In one example, CMD 634 represents signal lines shared in parallel with multiple memory devices. In one example, multiple memory devices share encoding command signal lines of CMD 634, and each has a separate chip select (CS_n) signal line to select individual memory devices.

It will be understood that in the example of system 600, the bus between memory controller 620 and memory devices 640 includes a subsidiary command bus CMD 634 and a subsidiary bus to carry the write and read data, DQ 636. In one example, the data bus can include bidirectional lines for read data and for write/command data. In another example, the subsidiary bus DQ 636 can include unidirectional write signal lines for write and data from the host to memory, and can include unidirectional lines for read data from the memory to the host. In accordance with the chosen memory technology and system design, other signals 638 may accompany a bus or sub bus, such as strobe lines DQS. Based on design of system 600, or implementation if a design supports multiple implementations, the data bus can have more or less bandwidth per memory device 640. For example, the data bus can support memory devices that have either a x4 interface, a x8 interface, a x16 interface, or other interface. The convention "xW," where W is an integer that refers to an interface size or width of the interface of memory device 640, which represents a number of signal lines to exchange data with memory controller 620. The interface size of the memory devices is a controlling factor on how many memory devices can be used concurrently per channel in system 600 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 640 and memory controller 620 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 640 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 640 represent memory resources for system 600. In one example, each memory device 640 is a separate memory die. In one example, each memory device 640 can interface with multiple (e.g., 2) channels per device or die. Each memory device 640 includes I/O interface logic 642, which has a bandwidth determined by the implementation of the device (e.g., x16 or x8 or some other interface bandwidth). I/O interface logic 642 enables the memory devices to interface with memory controller 620. I/O interface logic 642 can include a hardware interface, and can be in accordance with I/O 622 of memory controller 620, but at the memory device end. In one example, multiple memory devices 640 are connected in parallel to the same command and data buses. In another example, multiple memory devices 640 are connected in parallel to the same command bus, and are connected to different data buses. For example, system 600 can be configured with multiple memory devices 640 coupled in parallel, with each memory device responding to a command, and accessing memory resources 660 internal to each. For a Write operation, an individual memory device 640 can write a portion of the overall data word, and for a Read operation, an individual memory device 640 can fetch a portion of the overall data word. The remaining bits of the word will be provided or received by other memory devices in parallel.

In one example, memory devices 640 are disposed directly on a motherboard or host system platform (e.g., a PCB (printed circuit board) on which processor 610 is disposed) of a computing device. In one example, memory devices 640 can be organized into memory modules 670. In one example, memory modules 670 represent dual inline memory modules (DIMMs). In one example, memory modules 670 represent other organization of multiple memory devices to share at least a portion of access or control circuitry, which can be a separate circuit, a separate device, or a separate board from the host system platform. Memory modules 670 can include multiple memory devices 640, and the memory modules can include support for multiple separate channels to the included memory devices disposed on them. In another example, memory devices 640 may be incorporated into the same package as memory controller 620, such as by techniques such as multi-chip-module (MCM), package-on-package, through-silicon via (TSV), or other techniques or combinations. Similarly, in one example, multiple memory devices 640 may be incorporated into memory modules 670, which themselves may be incorporated into the same package as memory controller 620. It will be appreciated that for these and other implementations, memory controller 620 may be part of host processor 610.

Memory devices 640 each include one or more memory arrays 660. Memory array 660 represents addressable memory locations or storage locations for data. Typically, memory array 660 is managed as rows of data, accessed via wordline (rows) and bitline (individual bits within a row) control. Memory array 660 can be organized as separate channels, ranks, and banks of memory. Channels may refer to independent control paths to storage locations within memory devices 640. Ranks may refer to common locations across multiple memory devices (e.g., same row addresses within different devices) in parallel. Banks may refer to sub-arrays of memory locations within a memory device 640. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 640 include one or more registers 644. Register 644 represents one or more storage devices or storage locations that provide configuration or settings for the operation of the memory device. In one example, register 644 can provide a storage location for memory device 640 to store data for access by memory controller 620 as part of a control or management operation.

In one example, register 644 includes one or more Mode Registers. In one example, register 644 includes one or more multipurpose registers. The configuration of locations within register 644 can configure memory device 640 to operate in different "modes," where command information can trigger different operations within memory device 640 based on the mode. Additionally or in the alternative, different modes can also trigger different operation from address information or other signal lines depending on the mode. Settings of register 644 can indicate configuration for I/O settings (e.g., timing, termination or ODT (on-die termination) 646, driver configuration, or other I/O settings).

In one example, memory device 640 includes ODT 646 as part of the interface hardware associated with I/O 642. ODT 646 can be configured as mentioned above, and provide settings for impedance to be applied to the interface to specified signal lines. In one example, ODT 646 is applied to DQ signal lines. In one example, ODT 646 is applied to command signal lines. In one example, ODT 646 is applied to address signal lines. In one example, ODT 646 can be applied to any combination of the preceding. The ODT settings can be changed based on whether a memory device is a selected target of an access operation or a non-target device. ODT 646 settings can affect the timing and reflections of signaling on the terminated lines. Careful control over ODT 646 can enable higher-speed operation with improved matching of applied impedance and loading. ODT 646 can be applied to specific signal lines of I/O interface 642, 622 (for example, ODT for DQ lines or ODT for CA lines), and is not necessarily applied to all signal lines.

Memory device 640 includes controller 650, which represents control logic within the memory device to control internal operations within the memory device. For example, controller 650 decodes commands sent by memory controller 620 and generates internal operations to execute or satisfy the commands. Controller 650 can be referred to as an internal controller, and is separate from memory controller 620 of the host. Controller 650 can determine what mode is selected based on register 644, and configure the internal execution of operations for access to memory resources 660 or other operations based on the selected mode. Controller 650 generates control signals to control the routing of bits within memory device 640 to provide a proper interface for the selected mode and direct a command to the proper memory locations or addresses. Controller 650 includes command logic 652, which can decode command encoding received on command and address signal lines. Thus, command logic 652 can be or include a command decoder. With command logic 652, memory device can identify commands and generate internal operations to execute requested commands.

Referring again to memory controller 620, memory controller 620 includes command (CMD) logic 624, which represents logic or circuitry to generate commands to send to memory devices 640. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 640, memory controller 620 can issue commands via I/O 622 to cause memory device 640 to execute the commands. In one example, controller 650 of memory device 640 receives and decodes command and address information received via I/O 642 from memory controller 620. Based on the received command and address information, controller 650 can control the timing of operations of the logic and circuitry within memory device 640 to execute the commands. Controller 650 is responsible for compliance with standards or specifications within memory device 640, such as timing and signaling requirements. Memory controller 620 can implement compliance with standards or specifications by access scheduling and control.

Memory controller 620 includes scheduler 630, which represents logic or circuitry to generate and order transactions to send to memory device 640. From one perspective, the primary function of memory controller 620 could be said to schedule memory access and other transactions to memory device 640. Such scheduling can include generating the transactions themselves to implement the requests for data by processor 610 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 620 typically includes logic such as scheduler 630 to allow selection and ordering of transactions to improve performance of system 600. Thus, memory controller 620 can select which of the outstanding transactions should be sent to memory device 640 in which order, which is typically achieved with logic much more complex that a simple first-in first-out algorithm. Memory controller 620 manages the transmission of the transactions to memory device 640, and manages the timing associated with the transaction. In one example, transactions have deterministic timing, which can be managed by memory controller 620 and used in determining how to schedule the transactions with scheduler 630.

In one example, memory controller 620 includes refresh (REF) logic 626. Refresh logic 626 can be used for memory resources that are volatile and need to be refreshed to retain a deterministic state. In one example, refresh logic 626 indicates a location for refresh, and a type of refresh to perform. Refresh logic 626 can trigger self-refresh within memory device 640, or execute external refreshes which can be referred to as auto refresh commands) by sending refresh commands, or a combination. In one example, controller 650 within memory device 640 includes refresh logic 654 to apply refresh within memory device 640. In one example, refresh logic 654 generates internal operations to perform refresh in accordance with an external refresh received from memory controller 620. Refresh logic 654 can determine if a refresh is directed to memory device 640, and what memory resources 660 to refresh in response to the command.

Figure 7:
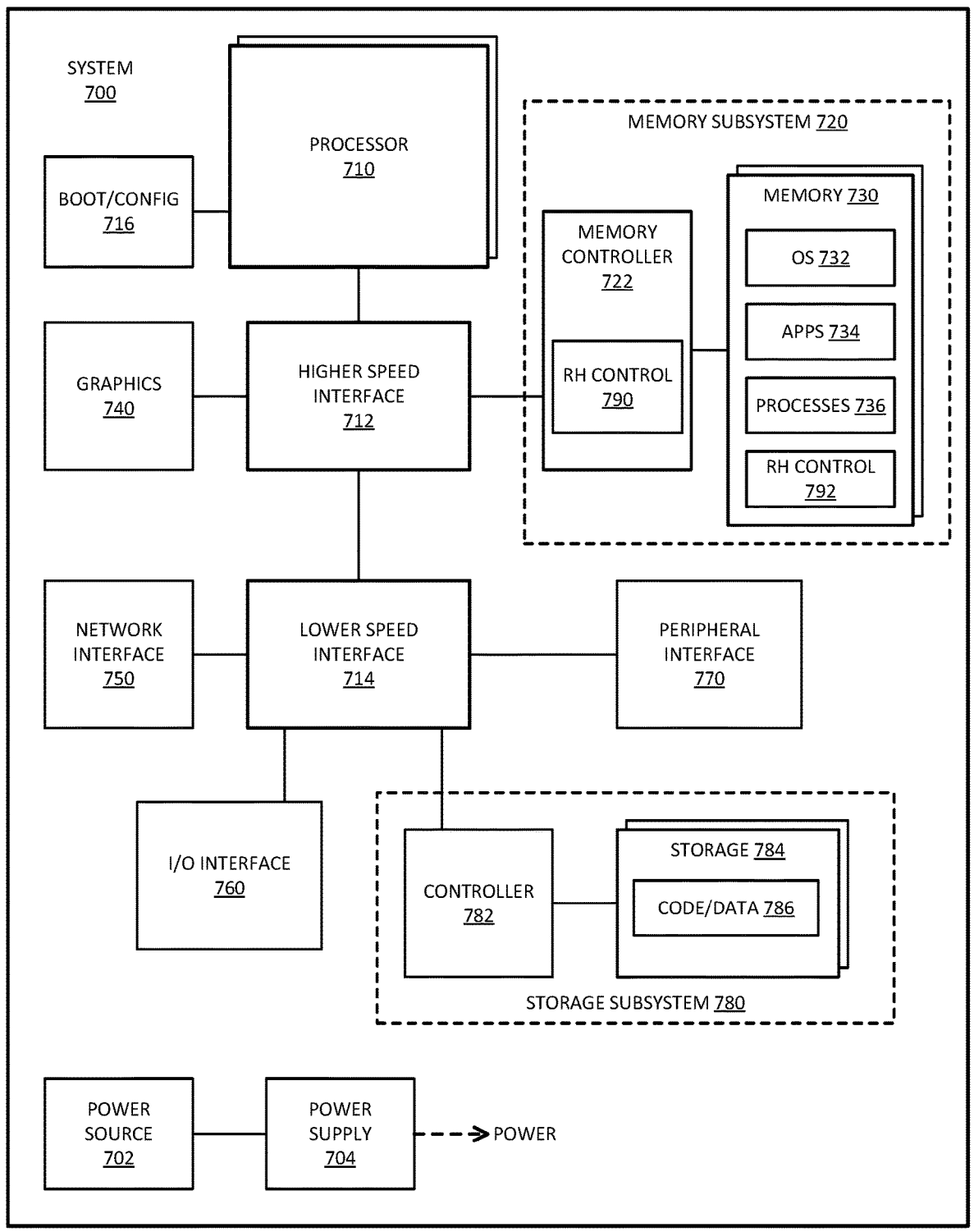
FIG. 7 is a block diagram of an example of a computing system in which selectively increasing a perfect row hammer count can be implemented.

FIG. 7 is a block diagram of an example of a computing system in which selectively increasing a perfect row hammer count can be implemented. System 700 represents a computing device in accordance with any example herein, and can be a laptop computer, a desktop computer, a tablet computer, a server, a gaming or entertainment control system, embedded computing device, or other electronic device.

System 700 represents a system in accordance with an example of system 100, an example of system 200, or an example of system 300. In one example, memory 730 includes row hammer (RH) control 792. Row hammer control 792 enables memory 730 to implement PRHT by maintaining a count for each row to indicate a number of counts for the row since the last refresh of that row. In one example, memory controller 722 includes row hammer (RH) control 790. Row hammer control 790 enables memory controller 722 to maintain an address buffer to store most recently used row addresses for access to memory 730. Based on the storage of most recently used row addresses and other determinations, memory controller 722 can generate an indication to memory 730 to increment its row activation count by a value greater than one for selected accesses, and to increment by zero or bypass incrementing the count for other accesses. The indication and the bypassing of the incrementing the count can be in accordance with any example herein.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system level hardware that operates outside of a host OS. Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more varieties of random-access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, NAND, 3DXP, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
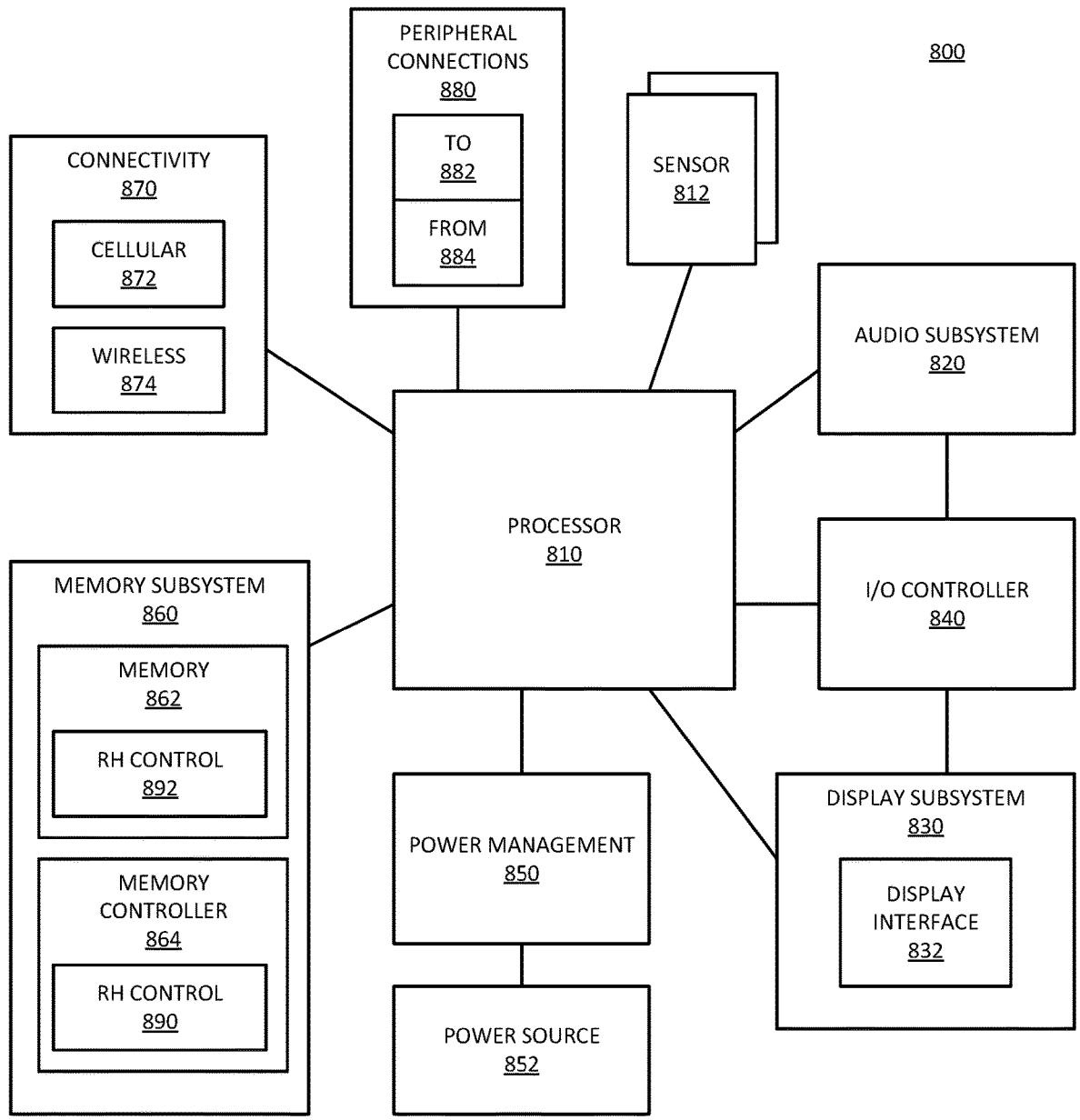
FIG. 8 is a block diagram of an example of a mobile device in which selectively increasing a perfect row hammer count can be implemented.

FIG. 8 is a block diagram of an example of a mobile device in which selectively increasing a perfect row hammer count can be implemented. System 800 represents a mobile computing device, such as a computing tablet, a mobile phone or smartphone, wearable computing device, or other mobile device, or an embedded computing device. It will be understood that certain of the components are shown generally, and not all components of such a device are shown in system 800.

System 800 represents a system in accordance with an example of system 100, an example of system 200, or an example of system 300. In one example, memory 862 includes row hammer (RH) control 892. Row hammer control 892 enables memory 862 to implement PRHT by maintaining a count for each row to indicate a number of counts for the row since the last refresh of that row. In one example, memory controller 864 includes row hammer (RH) control 890. Row hammer control 890 enables memory controller 864 to maintain an address buffer to store most recently used row addresses for access to memory 862. Based on the storage of most recently used row addresses and other determinations, memory controller 864 can generate an indication to memory 862 to increment its row activation count by a value greater than one for selected accesses, and to increment by zero or bypass incrementing the count for other accesses. The indication and the bypassing of the incrementing the count can be in accordance with any example herein.

System 800 includes processor 810, which performs the primary processing operations of system 800. Processor 810 can be a host processor device. Processor 810 can include one or more physical devices, such as microprocessors, application processors, microcontrollers, programmable logic devices, or other processing means. The processing operations performed by processor 810 include the execution of an operating platform or operating system on which applications and device functions are executed. The processing operations include operations related to I/O (input/output) with a human user or with other devices, operations related to power management, operations related to connecting system 800 to another device, or a combination. The processing operations can also include operations related to audio I/O, display I/O, or other interfacing, or a combination. Processor 810 can execute data stored in memory. Processor 810 can write or edit data stored in memory.

In one example, system 800 includes one or more sensors 812. Sensors 812 represent embedded sensors or interfaces to external sensors, or a combination. Sensors 812 enable system 800 to monitor or detect one or more conditions of an environment or a device in which system 800 is implemented. Sensors 812 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 812 can also include sensors for biometric systems such as fingerprint recognition systems, face detection or recognition systems, or other systems that detect or recognize user features. Sensors 812 should be understood broadly, and not limiting on the many different types of sensors that could be implemented with system 800. In one example, one or more sensors 812 couples to processor 810 via a frontend circuit integrated with processor 810. In one example, one or more sensors 812 couples to processor 810 via another component of system 800.

In one example, system 800 includes audio subsystem 820, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 800, or connected to system 800. In one example, a user interacts with system 800 by providing audio commands that are received and processed by processor 810.

Display subsystem 830 represents hardware (e.g., display devices) and software components (e.g., drivers) that provide a visual display for presentation to a user. In one example, the display includes tactile components or touchscreen elements for a user to interact with the computing device. Display subsystem 830 includes display interface 832, which includes the particular screen or hardware device used to provide a display to a user. In one example, display interface 832 includes logic separate from processor 810 (such as a graphics processor) to perform at least some processing related to the display. In one example, display subsystem 830 includes a touchscreen device that provides both output and input to a user. In one example, display subsystem 830 includes a high definition (HD) or ultra-high definition (UHD) display that provides an output to a user. In one example, display subsystem includes or drives a touchscreen display. In one example, display subsystem 830 generates display information based on data stored in memory or based on operations executed by processor 810 or both.

I/O controller 840 represents hardware devices and software components related to interaction with a user. I/O controller 840 can operate to manage hardware that is part of audio subsystem 820, or display subsystem 830, or both. Additionally, I/O controller 840 illustrates a connection point for additional devices that connect to system 800 through which a user might interact with the system. For example, devices that can be attached to system 800 might include microphone devices, speaker or stereo systems, video systems or other display device, keyboard or keypad devices, buttons/switches, or other I/O devices for use with specific applications such as card readers or other devices.

As mentioned above, I/O controller 840 can interact with audio subsystem 820 or display subsystem 830 or both. For example, input through a microphone or other audio device can provide input or commands for one or more applications or functions of system 800. Additionally, audio output can be provided instead of or in addition to display output. In another example, if display subsystem includes a touchscreen, the display device also acts as an input device, which can be at least partially managed by I/O controller 840. There can also be additional buttons or switches on system 800 to provide I/O functions managed by I/O controller 840.

In one example, I/O controller 840 manages devices such as accelerometers, cameras, light sensors or other environmental sensors, gyroscopes, global positioning system (GPS), or other hardware that can be included in system 800, or sensors 812. The input can be part of direct user interaction, as well as providing environmental input to the system to influence its operations (such as filtering for noise, adjusting displays for brightness detection, applying a flash for a camera, or other features).

In one example, system 800 includes power management 850 that manages battery power usage, charging of the battery, and features related to power saving operation. Power management 850 manages power from power source 852, which provides power to the components of system 800. In one example, power source 852 includes an AC to DC (alternating current to direct current) adapter to plug into a wall outlet. Such AC power can be renewable energy (e.g., solar power, motion based power). In one example, power source 852 includes only DC power, which can be provided by a DC power source, such as an external AC to DC converter. In one example, power source 852 includes wireless charging hardware to charge via proximity to a charging field. In one example, power source 852 can include an internal battery or fuel cell source.

Memory subsystem 860 includes memory device(s) 862 for storing information in system 800. Memory subsystem 860 can include nonvolatile (state does not change if power to the memory device is interrupted) or volatile (state is indeterminate if power to the memory device is interrupted) memory devices, or a combination. Memory 860 can store application data, user data, music, photos, documents, or other data, as well as system data (whether long-term or temporary) related to the execution of the applications and functions of system 800. In one example, memory subsystem 860 includes memory controller 864 (which could also be considered part of the control of system 800, and could potentially be considered part of processor 810). Memory controller 864 includes a scheduler to generate and issue commands to control access to memory device 862.

Connectivity 870 includes hardware devices (e.g., wireless or wired connectors and communication hardware, or a combination of wired and wireless hardware) and software components (e.g., drivers, protocol stacks) to enable system 800 to communicate with external devices. The external device could be separate devices, such as other computing devices, wireless access points or base stations, as well as peripherals such as headsets, printers, or other devices. In one example, system 800 exchanges data with an external device for storage in memory or for display on a display device. The exchanged data can include data to be stored in memory, or data already stored in memory, to read, write, or edit data.

Connectivity 870 can include multiple different types of connectivity. To generalize, system 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 874 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that system 800 could both be a peripheral device ("to" 882) to other computing devices, as well as have peripheral devices ("from" 884) connected to it. System 800 commonly has a "docking" connector to connect to other computing devices for purposes such as managing (e.g., downloading, uploading, changing, synchronizing) content on system 800. Additionally, a docking connector can allow system 800 to connect to certain peripherals that allow system 800 to control content output, for example, to audiovisual or other systems.

In addition to a proprietary docking connector or other proprietary connection hardware, system 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

Figure 9:
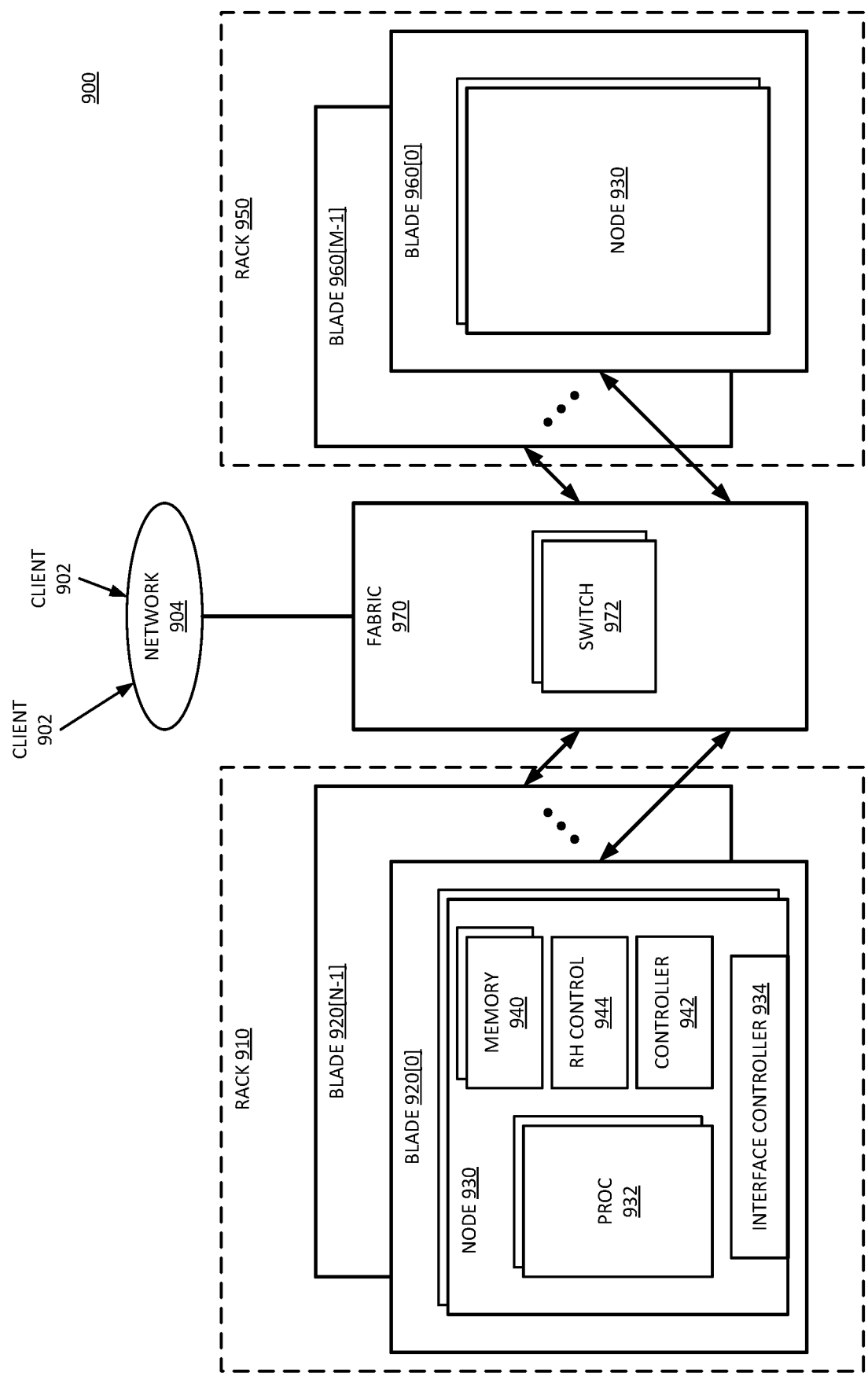
FIG. 9 is a block diagram of an example of a multi-node network in which selectively increasing a perfect row hammer count can be implemented.

FIG. 9 is a block diagram of an example of a multi-node network in which selectively increasing a perfect row hammer count can be implemented. System 900 represents a network of nodes that can apply adaptive ECC. In one example, system 900 represents a data center. In one example, system 900 represents a server farm. In one example, system 900 represents a data cloud or a processing cloud.

Node represents a system in accordance with an example of system 100, an example of system 200, or an example of system 300. In one example, memory 940 includes node 930 includes row hammer (RH) control 944. Row hammer control 944 represents components at memory 940 and at controller 942. Row hammer control 944 enables memory 940 to implement PRHT by maintaining a count for each row to indicate a number of counts for the row since the last refresh of that row. In one example, row hammer control 944 controller 942 to maintain an address buffer to store most recently used row addresses for access to memory 940. Based on the storage of most recently used row addresses and other determinations, memory controller 942 can generate an indication to memory 940 to increment its row activation count by a value greater than one for selected accesses, and to increment by zero or bypass incrementing the count for other accesses. The indication and the bypassing of the incrementing the count can be in accordance with any example herein.

One or more clients 902 make requests over network 904 to system 900. Network 904 represents one or more local networks, or wide area networks, or a combination. Clients 902 can be human or machine clients, which generate requests for the execution of operations by system 900. System 900 executes applications or data computation tasks requested by clients 902.

In one example, system 900 includes one or more racks, which represent structural and interconnect resources to house and interconnect multiple computation nodes. In one example, rack 910 includes multiple nodes 930. In one example, rack 910 hosts multiple blade components 920. Hosting refers to providing power, structural or mechanical support, and interconnection. Blades 920 can refer to computing resources on printed circuit boards (PCBs), where a PCB houses the hardware components for one or more nodes 930. In one example, blades 920 do not include a chassis or housing or other "box" other than that provided by rack 910. In one example, blades 920 include housing with exposed connector to connect into rack 910. In one example, system 900 does not include rack 910, and each blade 920 includes a chassis or housing that can stack or otherwise reside in close proximity to other blades and allow interconnection of nodes 930.

System 900 includes fabric 970, which represents one or more interconnectors for nodes 930. In one example, fabric 970 includes multiple switches 972 or routers or other hardware to route signals among nodes 930. Additionally, fabric 970 can couple system 900 to network 904 for access by clients 902. In addition to routing equipment, fabric 970 can be considered to include the cables or ports or other hardware equipment to couple nodes 930 together. In one example, fabric 970 has one or more associated protocols to manage the routing of signals through system 900. In one example, the protocol or protocols is at least partly dependent on the hardware equipment used in system 900.

As illustrated, rack 910 includes N blades 920. In one example, in addition to rack 910, system 900 includes rack 950. As illustrated, rack 950 includes M blades 960. M is not necessarily the same as N; thus, it will be understood that various different hardware equipment components could be used, and coupled together into system 900 over fabric 970. Blades 960 can be the same or similar to blades 920. Nodes 930 can be any type of node and are not necessarily all the same type of node. System 900 is not limited to being homogenous, nor is it limited to not being homogenous.

For simplicity, only the node in blade 920[0] is illustrated in detail. However, other nodes in system 900 can be the same or similar. At least some nodes 930 are computation nodes, with processor (proc) 932 and memory 940. A computation node refers to a node with processing resources (e.g., one or more processors) that executes an operating system and can receive and process one or more tasks. In one example, at least some nodes 930 are server nodes with a server as processing resources represented by processor 932 and memory 940. A storage server refers to a node with more storage resources than a computation node, and rather than having processors for the execution of tasks, a storage server includes processing resources to manage access to the storage nodes within the storage server.

In one example, node 930 includes interface controller 934, which represents logic to control access by node 930 to fabric 970. The logic can include hardware resources to interconnect to the physical interconnection hardware. The logic can include software or firmware logic to manage the interconnection. In one example, interface controller 934 is or includes a host fabric interface, which can be a fabric interface in accordance with any example described herein.

Processor 932 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 940 can be or include memory devices and a memory controller.

In general with respect to the descriptions herein, in one example a memory controller includes: command logic to generate an access command for a row address of a memory device that internally increments a row address activate count; and circuitry to determine whether the row address is one of N row addresses to which most recent access commands have been sent; wherein if the row address is not one of the N row addresses, the command logic is to generate an indication command to send to the memory device to trigger the memory device to internally increment the activate count by M, wherein M is an integer greater than one; and wherein if the row address is one of the N row addresses, the command logic is to generate an indication command to send to the memory device to trigger the memory device to internally not increment the activate count.

In one example of the memory controller, M equals 2. In accordance with any preceding example of the memory controller, in one example, the N row addresses comprise N row addresses for a single bank of the memory device. In accordance with any preceding example of the memory controller, in one example, the indication command comprises an activate command with a field to indicate M. In accordance with any preceding example of the memory controller, in one example, the indication command comprises a precharge command with a field to indicate M. In accordance with any preceding example of the memory controller, in one example, the indication command comprises a specialized command to indicate M. In accordance with any preceding example of the memory controller, in one example, the memory controller includes: a row address storage to store the N row addresses. In accordance with any preceding example of the memory controller, in one example, the circuitry is to remove the row address from the storage after generation of M access commands. In accordance with any preceding example of the memory controller, in one example, the N row addresses comprise N row addresses for a rank, wherein the storage is to store bank address and bank group address for each row address.

In general with respect to the descriptions herein, in one example a computer system includes: a memory device to internally increment a row address activate count; and a memory controller including: command logic to generate an access command for a row address of the memory device; and circuitry to determine whether the row address is one of N row addresses to which most recent access commands have been sent; wherein if the row address is not one of the N row addresses, the command logic is to generate an indication command with an indication of M, where M is an integer greater than one; and wherein if the row address is one of the N row addresses, the command logic is to generate an indication command with an indication of zero; wherein, in response to the indication command with the indication of M, the memory device is to internally increment the activate count by M, and in response to the indication command with the indication of zero, the memory device is to forego internally incrementing the activate count.

In one example of the computer system, the N row addresses comprise N row addresses for a single bank of the memory device. In accordance with any preceding example of the computer system, in one example, the indication command comprises one of: an activate command with a field to indicate M, a precharge command with a field to indicate M, or a specialized command to indicate M. In accordance with any preceding example of the computer system, in one example, the computer system includes: a row address storage to store the N row addresses, wherein the circuitry is to remove the row address from the storage after generation of M access commands. In accordance with any preceding example of the computer system, in one example, the N row addresses comprise N row addresses for a rank, wherein the storage is to store bank address and bank group address for each row address. In accordance with any preceding example of the computer system, in one example, the computer system includes one or more of: a host processor coupled to the memory controller; a display communicatively coupled to a host processor; a network interface communicatively coupled to a host processor; or a battery to power the computer system.

In general with respect to the descriptions herein, in one example a method for computation includes: generating an access command for a row address of a memory device that internally increments a row address activate count; determining whether the row address is one of N row addresses to which most recent access commands have been sent; wherein if the row address is not one of the N row addresses, generating an indication command to send to the memory device to trigger the memory device to internally increment the activate count by M, wherein M is an integer greater than one; and wherein if the row address is one of the N row addresses, generating an indication command to send to the memory device to trigger the memory device to internally not increment the activate count.

In one example of the method, the N row addresses comprise N row addresses for a single bank of the memory device. In accordance with any preceding example of the method, in one example, generating the indication command comprises one of: generating an activate command with a field to indicate M, generating a precharge command with a field to indicate M, or generating a specialized command to indicate M. In accordance with any preceding example of the method, in one example, the method includes: storing the N row addresses in a row address storage; and removing the row address from the storage after generation of M access commands. In accordance with any preceding example of the method, in one example, the N row addresses comprise N row addresses for a rank, wherein storing the N row addresses comprises storing bank address and bank group address for each row address.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory controller comprising:
   command logic to generate access commands to N different row addresses of a memory device that internally increments a row address activate count, and to generate a subsequent access command for a first row address of the memory device; and
   circuitry to determine whether the first row address is one of the N different row addresses;
   wherein if the first row address is not one of the N different row addresses, the command logic is to generate an indication command to send to the memory device to trigger the memory device to internally increment the activate count by M, wherein M is an integer greater than one; and
   wherein if the first row address is one of the N different row addresses, the command logic is to generate an indication command to send to the memory device to trigger the memory device to internally not increment the activate count.

2. The memory controller of claim 1, wherein M equals 2.

3. The memory controller of claim 1, wherein the N different row addresses comprise N different row addresses for a single bank of the memory device.

4. The memory controller of claim 1, wherein the indication command comprises an activate command with a field to indicate M.

5. The memory controller of claim 1, wherein the indication command comprises a precharge command with a field to indicate M.

6. The memory controller of claim 1, wherein the indication command comprises a specialized command to indicate M.

7. The memory controller of claim 1, further comprising:
a row address storage to store the N different row addresses.

8. The memory controller of claim 7, wherein the circuitry is to remove the first row address from the row address storage after generation of M access commands.

9. The memory controller of claim 7, wherein the N different row addresses comprise N different row addresses for a rank, wherein the row address storage is to store bank address and bank group address for each row address.

10. A computer system, comprising:
a memory device to internally increment a row address activate count; and
a memory controller including:
command logic to generate access commands to N different row addresses of the memory device, and to generate a subsequent access command for a first row address of the memory device; and
circuitry to determine whether the first row address is one of the N different row addresses;
wherein if the first row address is not one of the N different row addresses, the command logic is to generate an indication command with an indication of M, where M is an integer greater than one; and
wherein if the first row address is one of the N different row addresses, the command logic is to generate an indication command with an indication of zero;
wherein, in response to the indication command with the indication of M, the memory device is to internally increment the activate count by M, and in response to the indication command with the indication of zero, the memory device is to forego internally incrementing the activate count.

11. The computer system of claim 10, wherein the N different row addresses comprise N different row addresses for a single bank of the memory device.

12. The computer system of claim 10, wherein the indication command comprises one of: an activate command with a field to indicate M, a precharge command with a field to indicate M, or a specialized command to indicate M.

13. The computer system of claim 10, further comprising:
a row address storage to store the N different row addresses, wherein the circuitry is to remove the first row address from the row address storage after generation of M access commands.

14. The computer system of claim 13, wherein the N different row addresses comprise N different row addresses for a rank, wherein the row address storage is to store bank address and bank group address for each row address.

15. The computer system of claim 10, including one or more of:
a host processor coupled to the memory controller;
a display communicatively coupled to a host processor;
a network interface communicatively coupled to a host processor; or
a battery to power the computer system.

16. A method for computation, comprising:
generating access commands to N different row addresses of a memory device that internally increments a row address activate count, and to generate a subsequent access command for a first row address of the memory device;
determining whether the first row address is one of the N different row addresses;
wherein if the first row address is not one of the N different row addresses, generating an indication command to send to the memory device to trigger the memory device to internally increment the activate count by M, wherein M is an integer greater than one; and
wherein if the first row address is one of the N different row addresses, generating an indication command to send to the memory device to trigger the memory device to internally not increment the activate count.

17. The method of claim 16, wherein the N different row addresses comprise N different row addresses for a single bank of the memory device.

18. The method of claim 16, wherein generating the indication command comprises one of: generating an activate command with a field to indicate M, generating a precharge command with a field to indicate M, or generating a specialized command to indicate M.

19. The method of claim 16, further comprising:
storing the N different row addresses in a row address storage; and
removing the first row address from the row address storage after generation of M access commands.

20. The method of claim 19, wherein the N different row addresses comprise N different row addresses for a rank, wherein storing the N different row addresses comprises storing bank address and bank group address for each row address.

* * * * *